UNITED STATES PATENT OFFICE.

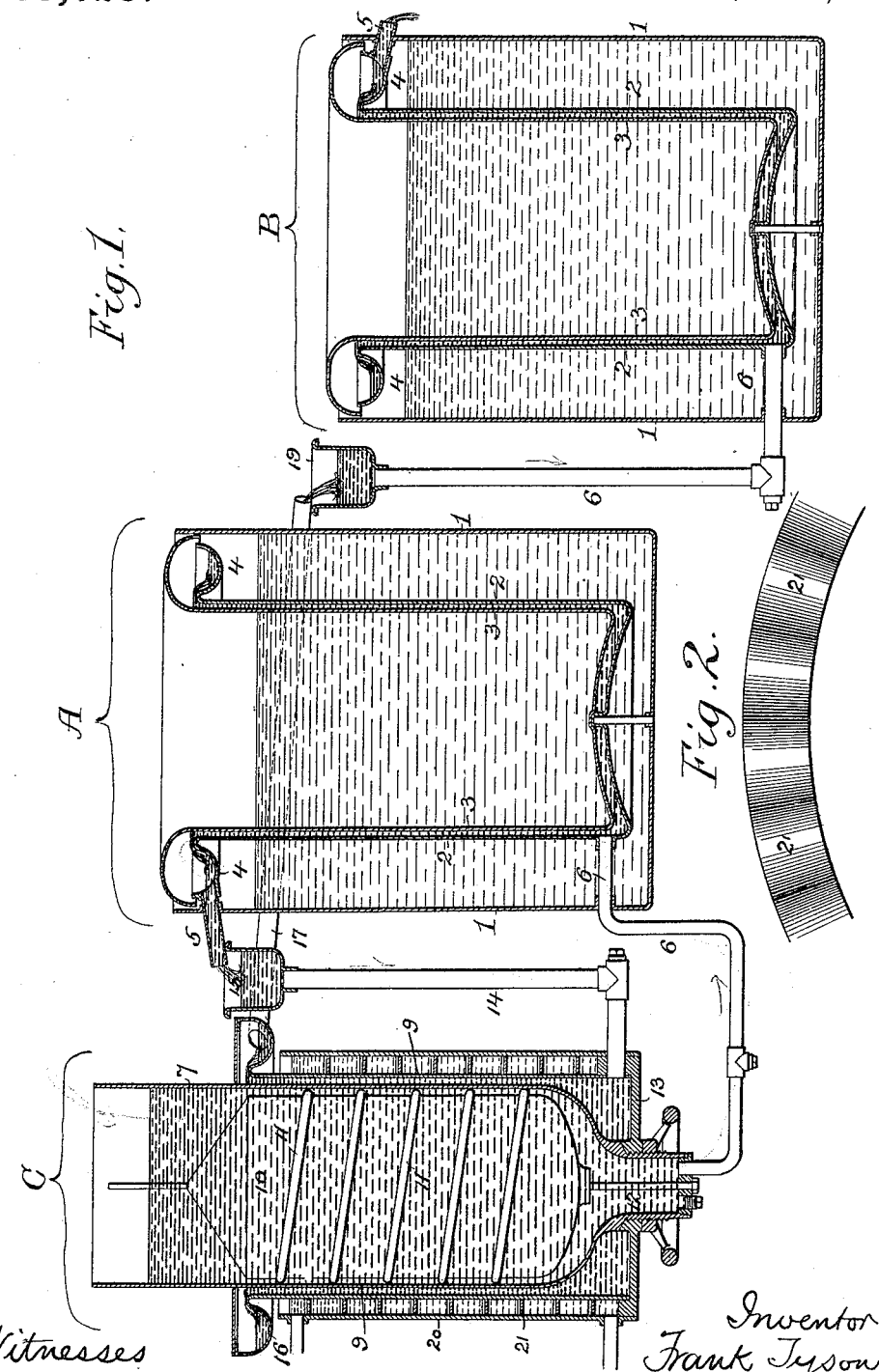

FRANK TYSON, OF CANTON, OHIO.

PASTEURIZING APPARATUS.

No. 903,029.  Specification of Letters Patent.  Patented Nov. 3, 1908.

Application filed July 12, 1906. Serial No. 325,839.

*To all whom it may concern:*

Be it known that I, FRANK TYSON, a citizen of the United States, and a resident of Canton, Ohio, have invented certain Improvements in Pasteurizing Apparatus, of which the following is a specification.

My invention relates to pasteurizing apparatus comprising a pair of vertical drums, one of slightly less diameter than the other, and so disposed within it as to provide a passage of contracted area between the two drums, through which passage the milk or other liquid to be pasteurized is caused to rise, being subjected, in its flow, to the action of the heating or cooling agent surrounding the outer drum and contained within the inner drum.

The object of my invention is to so dispose a series of devices of this character that the liquid to be treated will flow through the same by gravity, and to provide between the heating and cooling device usually combined in pasteurizing apparatus of this nature, what I term an "economizer", whereby the heated liquid, escaping from the primary or heating device of the series, will be partially cooled by the incoming supply of fresh liquid, and will correspondingly heat the latter.

In the accompanying drawing Figure 1 represents, in longitudinal section, apparatus constructed in accordance with my invention, and Fig. 2 is an enlarged view of part of one of the elements of the apparatus.

A represents the heating device and B the cooling device of a pasteurizing apparatus, and C represents the economizer. The devices A and B are substantially similar in construction, each comprising an outer vessel 1 for containing the heating or cooling agent, this vessel having, mounted within it, the two vertical drums 2 and 3. The drum 2 is heated or cooled by water or other agent contained in the vessel 1, and the drum 3 is likewise heated or cooled by water or other agent contained therein, whereby the milk or other fluid rising through the contracted space between the two drums will be subjected to such heating or cooling action.

At the top of the drum 2 is an annular collecting trough 4, with discharge spout 5, and with the lower portion of each drum 2 communicates the supply pipe 6, whereby the liquid to be treated is fed to the space between the two drums.

The economizer consists of three vertical drums 7, 9 and 20, the space between the intermediate drum 9 and the outer drum 20 being provided with an internal helical strip or web 21, so as to form a helical passage surrounding the drum 9.

Within the drum 7 is a drum 10, preferably closed at top and bottom, and having an external helical rib 11, which is in contact with an inner wall of the drum 7, whereby liquid deposited in said drum 7 is caused to follow a helical course in its passage from the upper portion of the drum to the lower portion of the same.

The drum or receptacle 7 terminates at the bottom in a contracted neck 12, which is securely confined to the bottom head 13 of the drum 9, and communicates with the supply pipe 6 of the heating vessel A of the pasteurizing apparatus.

The lower portion of the drum 9 communicates through a stand pipe 14 with a funnel 15 which receives the discharge from said heating vessel A of the pasteurizing apparatus, and said drum 9 terminates at the top in an annular trough 16 which communicates through a pipe 17 with a funnel 19 at the top of the stand pipe 6 which supplies the cooling device B of the pasteurizing apparatus.

Supposing that the drum or receptacle 7 is filled with the milk, or other liquid to be treated, up to a level above the top of the trough 4 of the primary or heating device of the pasteurizer, a hydrostatic column is provided which insures the flow by gravity of said milk, or other fluid, through the various vessels of the apparatus in the following manner. The milk flows from the neck 12 of the drum 7 through the pipe 6 into the lower portion of the drum 2 of the heating device, rises between the drums 2 and 3 of the same, and overflows into the trough 4, from which it passes through the pipe or spout 5 into the funnel 15, and thence through the stand pipe 14 into the lower portion of the drum 9, in which it rises in contact with the outer surface of the drum or receptacle 7, overflowing the top of the drum into the trough 16, from which it passes through the pipe 17 into the funnel 19, and thence through the stand pipe 6 into the lower portion of the drum 2 of the cooling device B, and after rising through the contracted space between the drums 2 and 3 of said device, overflows into the trough 4 of said drum 2, and finally escapes through the pipe or spout 5 of said trough into a suitable transporting or storing vessel.

In passing down through the drum or receptacle 7 the milk is caused to flow in a relatively thin film between said drum 7 and the internal drum 10, and is caused to follow a helical course determined by the convolutions of the rib 11, said milk thereby receiving its preliminary heating, and effecting the partial cooling of the warm milk from the heater A which ascends on the outer side of the drum 7, before being directed to the cooler B in which it receives its final cooling.

When it is desired to effect a further cooling of the heated milk than that resulting from the incoming supply of fresh milk, water or other cooling fluid is permitted to flow in a helical course through the space between the drums 9 and 20, the water either entering at the top and escaping at the bottom, as shown or following a course the reverse of this.

The helical web or strip 21, which is interposed between the drums 9 and 20 is transversely corrugated, as shown in Fig. 2, the corrugations being tapered, or wider at the outer periphery of said strip than at the inner periphery, in order to compensate for the difference in diameter of said peripheries.

The apparatus is entirely automatic in its action, the flow of the milk or other liquid to be treated continuing so long as the level of the milk in the drum 7 is maintained at a height above the top of the trough 4 of the heater A, the speed of flow being determined by the height or head of the hydrostatic column thus maintained.

I claim:—

1. Pasteurizing apparatus comprising a heater, a cooler, and an economizer, the latter consisting of a receptacle for the fresh supply of liquid to be treated, and a drum adjacent to said receptacle, a stand pipe for feeding said drum, a stand pipe for feeding the cooler and connections for conveying the liquid to be treated from the primary receptacle to the lower portion of the heater, from the upper portion of the same to the stand pipe for the drum, and from the upper portion of the latter to the stand pipe for the cooler.

2. The combination, in pasteurizing apparatus, of a heater, a cooler, a receptacle for the liquid to be pasteurized, a drum adjoining such receptacle, and providing between the two a passage for the flow of the liquid in its course from the heater to the cooler, and means for conveying the liquid to be treated from the receptacle to the lower portion of the heater, from the upper portion of the latter to the lower portion of the passage between the receptacle and the drum, and from the upper portion of the latter to the lower portion of the cooler.

3. The combination of the two drums, forming between them a passage for the flow of liquid, and a helical rib interposed between the two drums, and having tapered corrugations, with their wider portions at the periphery of greater diameter.

In testimony whereof, I have signed my name to this specification, in the presence of two subscribing witnesses.

FRANK TYSON.

Witnesses:
  WM. SIMPSON,
  H. B. STEWART.